R. L. WOOD.
INSECT DESTROYER.
APPLICATION FILED SEPT. 8, 1916.
1,222,706.
Patented Apr. 17, 1917.
4 SHEETS—SHEET 4.
Fig. 6.
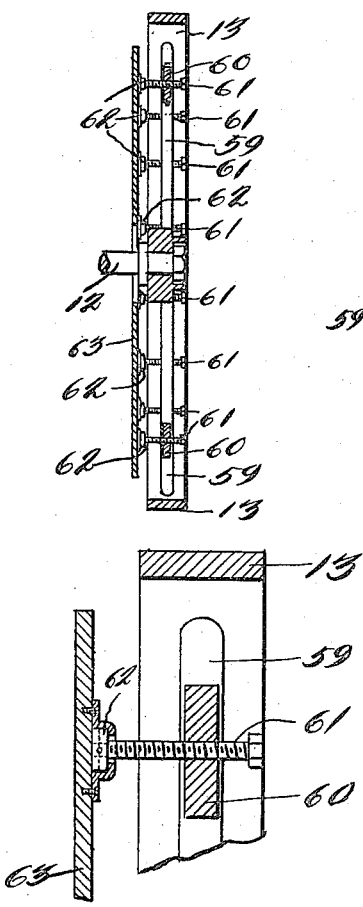
Fig. 5.
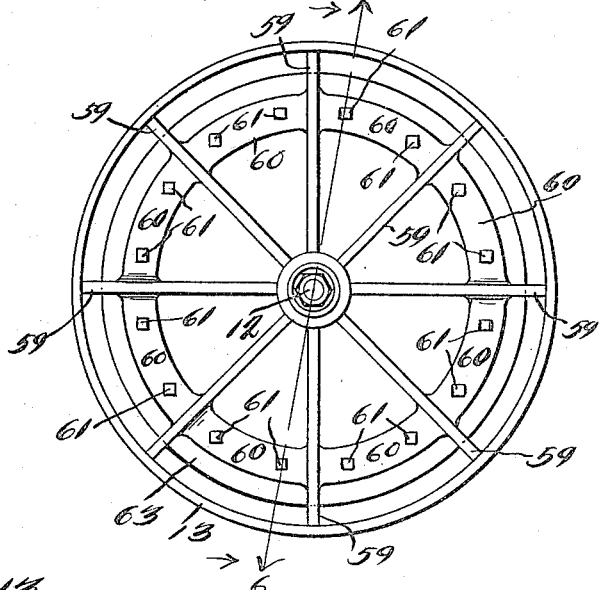
Fig. 7.
Witnesses
Inventor
R. L. Wood
By
Attorneys

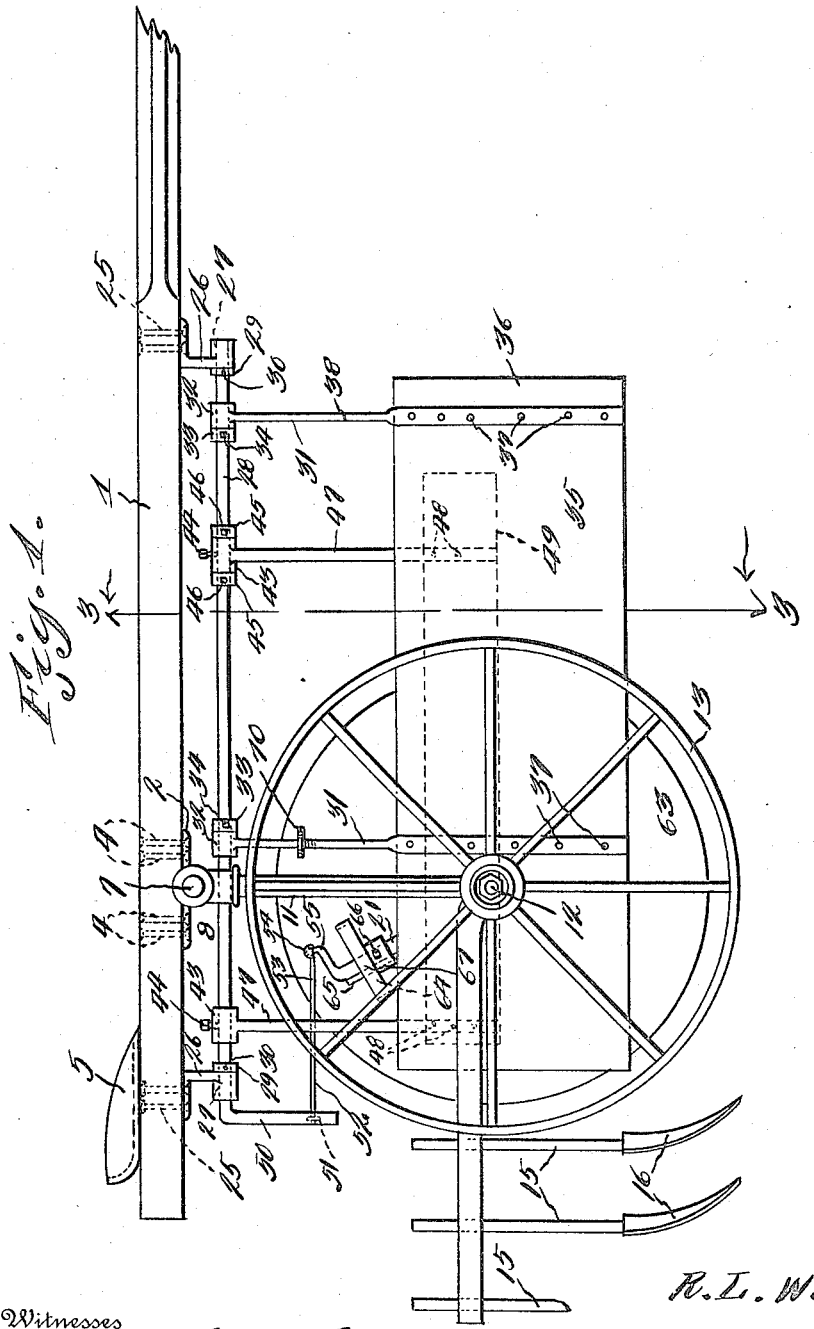

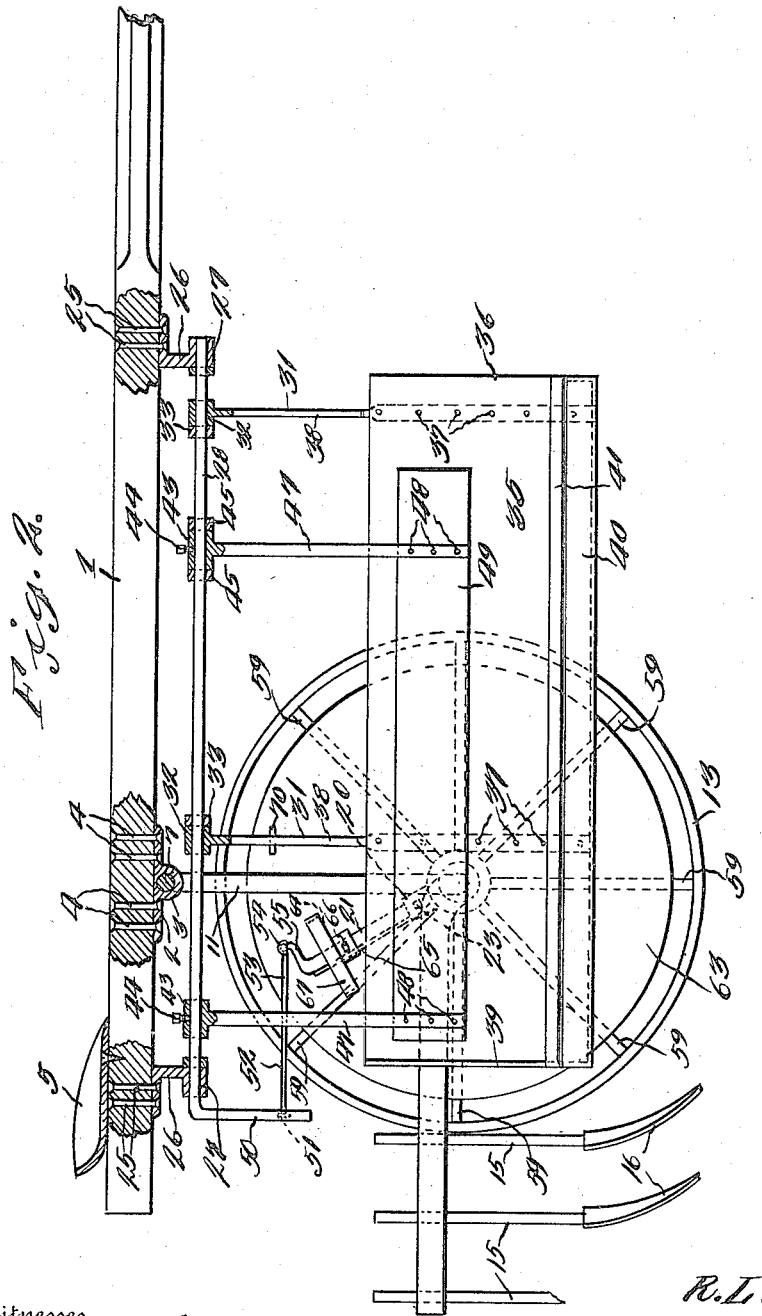

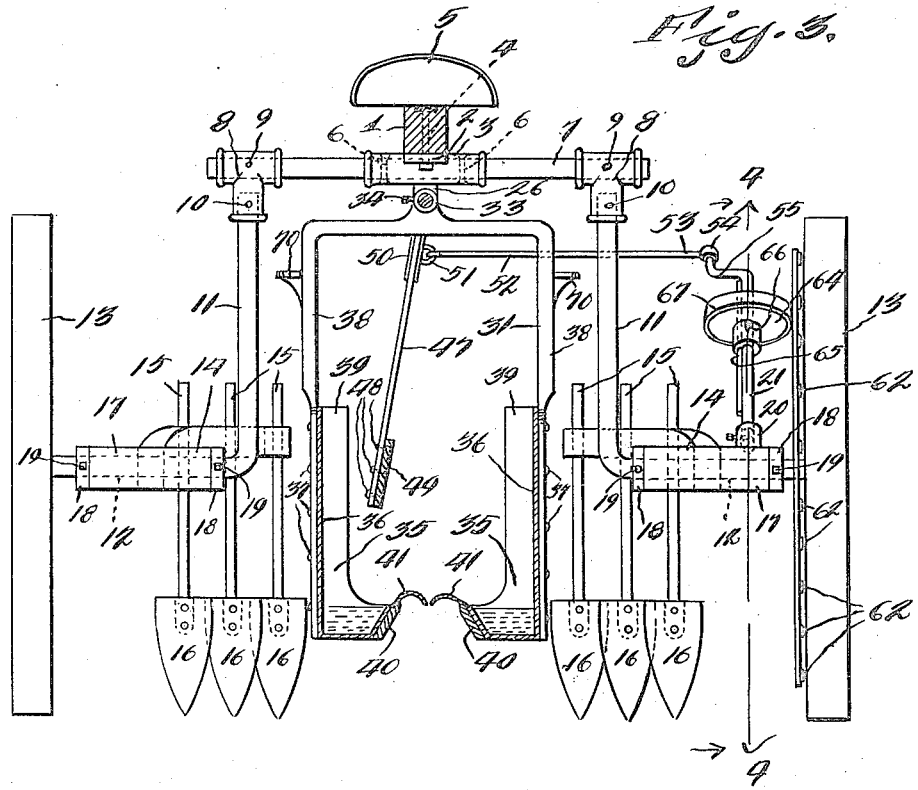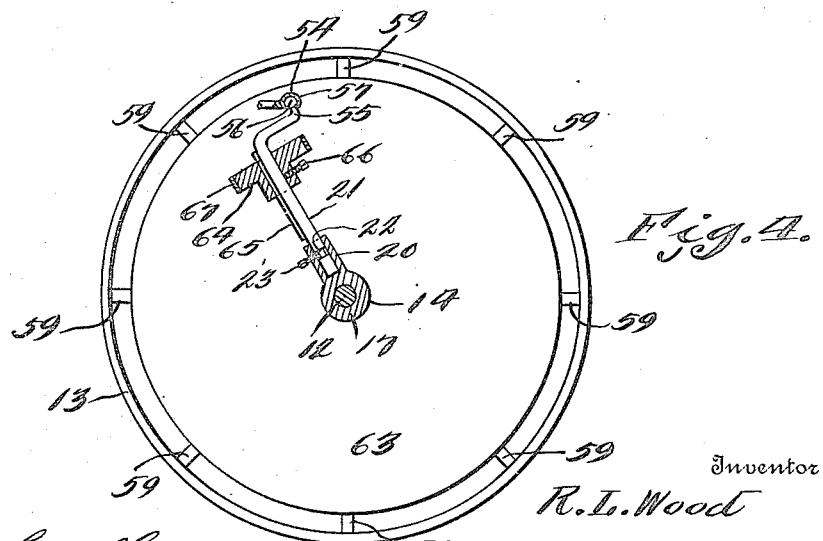

UNITED STATES PATENT OFFICE.

ROBERT L. WOOD, OF FORT DEPOSIT, ALABAMA.

INSECT-DESTROYER.

1,222,706.   Specification of Letters Patent.   Patented Apr. 17, 1917.

Application filed September 8, 1916. Serial No. 119,056.

*To all whom it may concern:*

Be it known that I, ROBERT L. WOOD, a citizen of the United States, residing at Fort Deposit, in the county of Lowndes, State of Alabama, have invented a new and useful Insect-Destroyer; and I do hereby declare the following to be a full, clear, and exact description of the invention, such as will enable others skilled in the art to which it appertains to make and use the same.

This invention relates to an improved boll weevil or other insect destroyer, and an object of the invention is to provide a device of this character which may be carried by any suitable wheel supported machine, preferably a cultivator or the like, whereby, as the machine is driven over the field, in order to till the soil about the plants or vines, so as to cultivate the same, the obnoxious insects, such as boll weevils, are removed from the plants or vines and destroyed.

A further object of the invention is to provide a suitable frame supported rockably on a shaft of the cultivating machine, and provided with suitable containers for the reception of suitable solution, which is poisonous to the insects.

A further object of the invention is to provide an oscillatory member carried by said shaft and adapted to be automatically oscillated, so as to shake or agitate the tops of the plants or vines causing the insects to fall therefrom, and into the poisonous solution in said containers.

In practical fields, the details of construction may necessitate alterations, falling within the scope of what is claimed.

The invention comprises further features and combination of parts, as hereinafter set forth, shown in the drawings, and claimed.

In the drawings:—

Figure 1 is a view in side elevation of a conventional form of cultivator, showing the same equipped with the improved insect destroyer.

Fig. 2 is a view partly in section and partly in elevation, illustrating the destroyer mounted upon said cultivator.

Fig. 3 is a sectional view on line 3—3 of Fig. 1, showing parts in elevation and parts in section.

Fig. 4 is a sectional view on line 4—4 of Fig. 3.

Fig. 5 is an outside view of one of the supporting or driving wheels of the cultivator, illustrating how one of the friction driving means is adjustably secured to the inner side of the wheel.

Fig. 6 is a sectional view on line 6—6 of Fig. 5.

Fig. 7 is an enlarged detail sectional view of the upper part of the wheel shown in Fig. 6, showing how the friction disk of said wheel is swiveled to the adjusting bolts.

Referring more especially to the drawings, 1 designates a beam of a conventional form of cultivator, to the substantially rear portion of which a plate 2 having a transverse tubular part 3, is secured by means of the bolts 4. A seat 5 is secured upon the rear end of the beam 1 and to be occupied by an operator. Secured in the tubular part 3 by means of the rivets 6 is a transversely disposed rod 7, to the opposite ends of which the transverse portions of the T-unions 8 are secured by the rivets 9. Secured by the rivets 10 in the vertical parts of said T-unions are the upper ends of the vertical portions 11 of the axles 12, upon the outer ends of which the supporting wheels 13 are mounted. By this construction, an arched axle for the supporting wheels and the holders 14 for the shanks 15 of the cultivating blades 16 is provided. Each of the holders 14 is provided with a sleeve 17, which is held against axial displacement by the collars 18, which are secured upon each axle by the set bolts 19. One of said sleeves 17 is provided with a tubular projection 20, which extends upwardly and rearwardly. A correspondingly extending shaft 21 has its lower end portion provided with an annular groove 22, and which end portion is secured in said tubular projection by a set bolt 23, which extends through the wall of the tubular projection, and partially into the annular groove, so as to revolubly mount the shaft 21 in said tubular projection.

Secured to the beam 1 by the rivets 25 are brackets 26 having bearings 27 for the shaft 28, there being collars 29 secured by pins 30 on the shaft and engaging the bearings 27, to prevent axial movement of the shaft 28.

A pair of inverted U-shaped members 31 is provided having bearings 32, which engage the shaft 28. Collars 33 are secured by the set bolts 34 on said shaft to prevent axial movements of the bearings 32. The inverted U-shaped members 31, it is to be noted, may rock slightly on the shaft.

Suitable containers 35 are provided, and each container is in the form of an elongated pan having an outer upwardly extending wall 36, which is secured by rivets or the like 37 to the corresponding arms 38 of said inverted U-shaped members. The end portions of each upwardly extending wall or flange 36 have end flanges 39. The inner or adjacent flanges of said containers 35 have wood strips 40 secured thereto in any suitable manner, and secured to the upper V-shaped edges of the wood strips are leather strips 41, which, in cross section, extend toward each other, and downwardly. The inner or adjacent flanges of said containers are spaced apart, so that the plants, vines, or the like, may pass between the containers, as the machine travels forwardly. The leather strips 41 are very flexible and are designed to brush against the stalks of the plants or vines, in order to prevent the insects, when dropping off the plants or the like, from falling between the containers, in which a suitable solution poisonous to the insects is carried.

Sleeves 43 are secured upon the shaft 28 by the set bolts 44, there being collars 45 secured upon said shaft by the set bolts 46, to prevent one of the sleeves 43 from axial movement. The sleeves 43 have downwardly projecting arms 47 which are secured at their lower ends by the screws 48 to an elongated strip 49, which, together with the arms 47, constitute, an oscillatory agitator. The rear end of the shaft 28 has a downwardly extending arm 50, to an eye 51 of which, a link 52 is pivotally connected. The end 53 of the link is provided with a universal joint connection 54 to the upper end of the crank 55 of the shaft 21. This universal connection consists of a ball 56 on the crank and a spherical bearing 57 at the end of the link 53, to receive the ball 56. After the ball is inserted in the bearing 57, said bearing is upset, to hold the ball in place.

One of the supporting wheels 13 of the cultivator has its spokes 59 connected by webs 60, transversely of which bolts 61 extend. The inner ends of the bolts 61 are connected by swiveled joints 62 to a friction disk 63, which is adjacent the inner face of said wheel. A wheel 64 is carried by the shaft 21, there being a key or feather 65 to hold the wheel 64 to rotate with the shaft 21, and yet be adjustable axially on said shaft. A set screw 66 extends through the hub of the wheel 64, to hold said wheel in different adjusted positions on its shaft. The wheel 64 is provided with a fiber band 67, to frictionally engage the disk 63, so that when the supporting wheels 13 are in motion, one of said wheels will frictionally transmit power to the shaft 21 through the disk 63 and the band 67 of the wheel 64. The shaft 21 will in turn oscillate the agitator, which, as the plants or vines pass between the flexible strips 41, will strike the plants or vines, thereby shake the insects from the plants, and which insects will fall into the poisonous solution of said container and become destroyed. By adjusting the wheel 64 axially on its shaft 21 and toward the center of the adjacent supporting wheel 13, the speed of the oscillatory strokes of the agitator will be decreased, and by adjusting the wheel 64 outwardly nearer the peripheral edge of the disk 63, the speed of the stroke of the agitator will be increased. By adjusting the disk 63 inwardly, the friction between said disk and the fiber belt will be increased, and if the disk 63 is adjusted to considerably lessen the friction between the leather band 67 and said disk 63, the wheel 64 will slip, in which case the agitator in its movement will decrease. The side arms 38 of the rearmost inverted U-shaped member are provided with foot rests 70, to be engaged by the feet of the operator, so that said U-shaped members with their containers may be oscillated transversely of the machine, so that the passage between the containers may accommodate itself to the irregularities of the plants. In some instances, it may be well to remove the feet of the operator from said rests, and allow the flexible strips 41 to follow the irregularities of the plants. It is to be noted that by loosening the collars 33 and 45, the inverted U-shaped members and the oscillatory agitator may be adjusted relatively to each other.

The invention having been set forth, what is claimed as new and useful, is:—

In an insect destroyer, a frame having an axle and supporting wheels thereon, a rocking shaft mounted in bearings of said frame, depending arms suspended from the forward and rear ends of said shaft, a pair of containers oppositely disposed and connected to the lower ends of said arms, said containers having broad outer sides and end flanges, said containers being spaced apart to form a passage, through which the plants pass, so that the insects will fall into a poisonous solution to be received in said containers, the rear arms having members to be engaged by the feet of the operator, so that the arms and their containers may be oscillated transversely of the machine, whereby the passage between the containers may accommodate itself to the irregularities of the plants, and an agitator rockable with the shaft to shake the plants, so that the insects will fall therefrom into the solution.

In testimony whereof I have signed my name to this specification in the presence of two subscribing witnesses.

ROBERT L. WOOD.

Witnesses:
 Jos. NoMOOR,
 J. H. THIGPEN.

Copies of this patent may be obtained for five cents each, by addressing the "Commissioner of Patents, Washington, D. C."